Sept. 16, 1969  W. MITTAG  3,466,940

MECHANISM FOR TENSIONING ENDLESS BELT-LIKE MEMBERS

Filed March 4, 1968

INVENTOR.
WALTER MITTAG
BY
Melvin A. Crosley

United States Patent Office 3,466,940
Patented Sept. 16, 1969

3,466,940
MECHANISM FOR TENSIONING ENDLESS BELT-LIKE MEMBERS
Walter Mittag, Heidenheim (Brenz), Germany, assignor to J. M. Voith, G.m.b.H., Heidenheim (Brenz), Germany
Filed Mar. 4, 1968, Ser. No. 710,217
Claims priority, application Germany, Mar. 18, 1967, V 33,286
Int. Cl. F16h 7/12
U.S. Cl. 74—242.14                                    13 Claims

ABSTRACT OF THE DISCLOSURE

A mechanism for tensioning an endless belt-like member which is entrained over a roller, in which the roller is supported in bearings and the bearings are supported on carriage means moveable at right angles to the axis of the roller to adjust the tension on the belt-like member. A drive mechanism is provided connected with the bearings of the roller for moving them in the direction to adjust the tension on the belt-like member and this drive mechanism comprises a first short stroke motor and a second longer stroke motor, each operable independently of the other for driving the drive means connected with the bearings so that the short stroke motor can be energized for maintaining a predetermined bias on the bearings in tensioning direction while the longer stroke motor can be utilized for adjusting the point of connection of the short stroke motor with the drive means.

---

Figure 1:
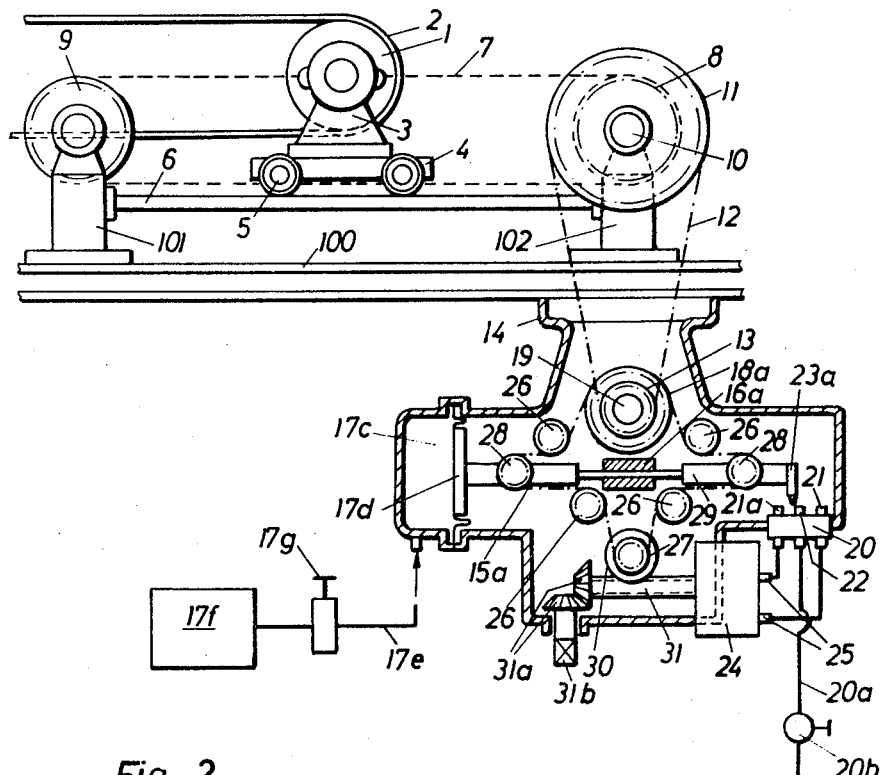

The present invention is particularly concerned with a device for tensioning belt-like members.

Many machines, of course, employ endless belts. A particular instance in which an endless belt-like member is employed is in connection with paper making where felts are employed in the papermaking machines, at the wet end of the machine for receiving the suspension from which the paper web is being made is formed and at various other places for conveying and drying the web. Papermakers' felts of the nature referred to must be maintained under closely controlled tension to allow for the best quality product to be produced in the machine and also to make sure that the felt is operating under the proper conditions. Such papermakers' felts are extremely expensive and have, at best, short life so that it is extremely important to be sure that the felt is properly supported and is running under the proper tension.

A felt of the nature referred to, furthermore, will tend to have a different length when it is running wet than if the supply of suspension thereto is interrupted so that the felt, or a portion thereof, runs dry, of if the paper web being supported on the felt tears or breaks. When such a felt is subjected to a change in moisture content, as mentioned above, it is necessary to effect adjustment of the tensioning roller for the felt in order to prevent damage to the felt. For example, when a portion or all of the felt becomes dry the felt tends to shrink, whereas when the felt again becomes wet, it will tend to lengthen and, under such conditions, the tensioning roller must be moved in a direction to maintain the tension in the belt within predetermined limits.

It is known, of course, to entrain a belt, or belt-like member, or an endless felt of the nature referred to, over a roller and to support the roller in bearings and to connect a driving device to the bearings for moving the roller at right angles to its axis of rotation for adjusting the tension on the belt-like members.

When such a device is employed for the felts of a papermaking machine, it must be expected that the felts, during continued operation thereof, will expand five to eight percent of their original length. When the felts are of any substantial length, the tensioning roller therefor must, therefore, be capable of being moved along the path of up to two or more meters in order to accommodate for the possible change in length of the belt.

Furthermore, if a machine having the tensioned belt thereon is slowed down or stopped, it is desirable to relieve the tension on the belt to prevent damage to the belt. Still further, when such a felt is exchanged for another it is important to be able to completely relieve the tension on the felt and permit the felt to fall slack so the old felt can be removed from its supporting rollers and a new felt installed thereon.

It has been mentioned that tensioning devices for the purposes described above are known but, heretofore, all such devices have left something to be desired in connection with the tensioning of papermakers' felts.

For example, there are known tensioning devices in which the bearings supporting the tensioning roller are moved by a pair of threaded spindles which are connected to rotate in unison.

It is also known to adjust the tension roller either directly, or through a transmission, utilizing, as motive power, fluid pressure piston cylinder means of known type.

It is also known that according to the prior art to support each of the two bearings of a tensioning roller on a carriage which is supported for movement in the tensioning direction. each bearing is engaged by a tensioning element which may be guided about a pair of rolls. One pair of the rolls at one and the same side of the tensioning roller may be fixed together by being mounted on a shaft and by exerting a turning moment on this shaft, a force is imparted to the aforementioned bearings so as to move the tensioning roller in tensioning direction.

The moment may be exerted on the aforementioned shaft in a number of different manners. For example, a drum can be placed on the shaft and a flexible element, such as a rope or cable, wound about the drum and employed for developing a moment on the shaft. The Canadian Patent 732,863 shows how an air motor can be employed for exerting a moment upon such a shaft either directly or with the interposition of a chain drive.

The German Patent 492,712 shows how the moment can be developed upon the shaft through the medium of a lever having weights thereon. United States Patent 2,918,970 shows a hydraulically or pneumatically loaded tensioning roller in which the hydraulically or pneumatically developed force acts upon the bearings of the tensioning roller with the interposition of a force transmitting element which permits a small path of shifting of the tensioning roller in the direction of the applied force.

In any case, where the amount of travel of the force transmitting element is limited, the tensioning force applied to the tensioning roller becomes nullified when the force transmitting element reaches either of its end positions. It has been proposed to provide electrically operated adjusting means for adjusting the point of attack of the force transmitting element on the mechanism which connects it to the tensioning roller so that the force transmitting element will again become effective after reaching an end position.

All of the aforementioned types of tensioning devices are beset by a number of drawback and defects. For example, when the bearings for the tensioning roller are adjusted by threaded spindles, this arrangement does not allow for an automatic compensation for the shrinkage and expansion of the felt so that the felt sometimes operates under too high a tension and at other times under too low a tension.

When pneumatically powered piston and cylinder means act upon the bearings for the tensioning roller, a very large and very long stroke cylinder piston arrangement is required for the reason of the size of the machine and for the reason that the tensioning forces must be high for large felts and also for the reason that the air pressure available in the compressed air mains in the plant only goes up to a certain maximum and fairly low pressure.

Hydraulic piston and cylinder arrangements operable at higher pressures can be employed and this will at least reduce the diameter of the piston and cylinders but such an arrangement requires auxiliary, expensive hydraulic equipment and controls which can require considerable maintenance.

It is also known in felt tensioning installations to connect the rolls over which the tensioning elements pass which lead to the bearings of the tensioning roller to a shaft and to subject the shaft to torsion to urge the bearings in tensioning direction. These arrangements, heretofore, have been attended with a number of defects because if the tensioning moment is applied to the shaft by a drum and a weight, guides between the drum and the rope or cable leading to the weight must be provided and, furthermore, the weights require considerable amount of space and must have a certain amount of travel in the vertical direction to be effective. Also, when a felt is to be changed in such a machine it is difficult to move the tensioning roller so that the old felt falls slack and can be readily removed from the machine and a new felt installed.

A principal defect of the weight biased tensioning devices is that the tension can be changed only with considerable trouble, as by removing weights or adding weights and this, of course, is a considerable disadvantage. Further, to observe safety in adjusting the tension, the machine must be shut down and this, of course, reduces production.

Electrically operated adjusting arrangements for the tensioning roller, particularly at the wet end of a paper machine are subject to disturbances because of moisture. In the dryer portion of the paper machine, exactly the opposite condition exists and difficulty is encountered with electrical devices on account of vapors and heat. It has thus, heretofore, been difficult to provide any electrically driven adjusting device which is generally applicable to various portions of a papermaking machine for tensioning the felts thereof.

The present invention proposes an arrangement which overcomes the defects referred to above and provides for a tensioning arrangement in which all of the necessary settings can be made outside the papermaking machine. By the use of the arrangement of the present invention, it is possible to place the tensioning roller into any desired position along its path of adjustment and to maintain any desired tension in the felt passing about the tensioning roller and all that is required in the way of power for the operation of the installation is the compressed air which normally exists in the compressed air mains of the plant and at the normal pressure thereof.

The problems referred to above have been solved, according to the present invention, in a mechanism wherein a tensioning roller is supported in bearings, and the bearings are, in turn, supported on carriage means, and flexible tensioning elements are connected to the bearings and pass around rolls or pulley-like members which are supported on a shaft for rotation in unison. The flexible tensioning elements may be in the form of belts, such as V belts, but are preferably in the form of chains, and one thereof is connected to each bearing for the tensioning roller so that the tension applied to the felt will be uniform from side to side. Preferably, each said tensioning element is in the form of a closed loop having two reaches with the pertaining bearing connected to one of the reaches of the respective tensioning element.

A particular feature of the present invention is that the mechanism for driving the shaft that supports the rolls over which the tensioning elements pass is designed to have two power inputs which operate independently of each other. One of these power inputs serves to bias the shaft in the tensioning direction and has a relatively limited stroke. The other of the power inputs is operable for adjusting the point of attack of the first power input upon the shaft so that the first power input is always operating within a limited range of its intermediate position and thus the tensioning force developed thereby is never nullified. The second power input has a greater stroke than the first power input and may, advantageously, be in the form of a rotary motor having no stroke limitations in either direction.

The two power inputs are drivingly related to each other through a differential mechanism which has an input member driven by each power input and an output member drivingly connected to the shaft of the tensioning mechanism. The first, and relatively short stroke, power input is preferably in the form of a reciprocable motor and the input member driven thereby is preferably a reciprocable member. Control means are provided sensitive to a predetermined movement of the reciprocable member from a certain intermediate position thereof for energizing the second power input to drive its input member in a direction to cause the reciprocable member to return to its intermediate position.

Due to the intermittent energization of the second power input, and also because it must operate in opposite directions, the input member driven thereby has associated therewith, or the second power input has associated therewith, a self-locking drive arrangement, such as a self-locking worm and worm wheel, so that when the second power input is deenergized, the input member driven thereby, is held against rotation.

By the use of a device as generally described above, it becomes possible to adjust the tension of a belt-like member, such as a papermaker's felt, regardless of the length of the felt and to maintain the tension at a predetermined value regardless of the changes in length of the felt within the limits of movement of the tensioning roller. This is readily accomplished automatically by a device according to the present invention without any attention by the machine operators.

Figure 2:
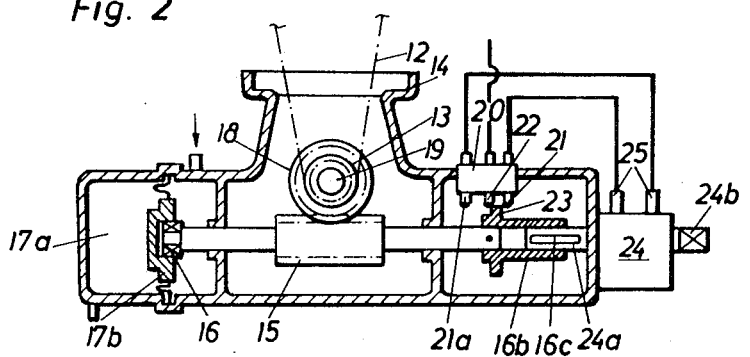

The exact nature of the present invention will be more clearly understood upon reference to the following detailed specification taken in connection with the accompanying drawings in which:

FIGURE 1, somewhat schematically, shows one form which a tensioning device, according to the present invention, can take; and FIGURE 2 is a view somewhat like FIGURE 1, but showing a modified form of the tensioning device.

Referring to the drawings somewhat more in detail, FIGURE 1 shows a tensioning roller 1 over which a felt 2 passes and which felt it is desired to maintain under substantially constant tension when in operation. Felt 2 may be a felt at the wet end of a papermaking machine, or a felt in the drier section of such a machine.

The roller 1 has a bearing 3 at each end and the bearings 3 are mounted on a carriage 4 which has wheels 5 that rollingly engage the rails 6 forming a part of the main machine structure 100. Rails 6 extend in the direction in which roller 1 is to be moved to adjust the tension felt 2, namely, at right angles to the axis of roller 1.

An endless tensioning element 7, which may be in the form of a chain, passes around supporting guide rollers 8 and 9 which are arranged on opposite sides of tensioning roller 1 and supported in pertaining bearings 101 and 102. Since there are two bearings 3, two of the tensioning elements 7 are employed and there are, accordingly, two of the guiding rollers 8. Rollers 8 are sprockets when the elements 7 are in the form of chains. Guide rollers 8 are fixed to a torsionally stiff shaft 10 which is rotatably supported in the bearings 102.

A first drive member in the form of a pulley or sprocket is mounted on the shaft 10, advantageously, but not necessarily, near the center thereof, and is indicated by reference numeral 11. Entrained about drive member 11 is a flexible drive element 12, which, when element 11 is a sprocket, is in the form of a chain. Element 11 passes around a second drive member 13 which will be in the form of a sprocket when the element 12 is a chain. Drive member 13 is the driving wheel while drive member 11 is the driven wheel.

Sprocket 13 is contained within a housing or casing 14 adapted for being secured to the main structure 100. Sprocket 13 is fixed to a shaft 19 rotatable in casing 14. Shaft 19 carries a second sprocket 18a. A chain 15a is entrained over sprocket 18a and is, furthermore, entrained over a further sprocket 27 rotatably supported in casing 14 in spaced relation to sprocket 18a.

A reciprocable member 29 is guided in a guide portion 16a of casing 14 so as to reciprocate in a direction transverse to a line connecting the axes of rotation of sprockets 18a and 27. This reciprocable member 29 has two idler rollers 28 thereon which are spaced apart and over which the aforementioned chain 15a is entrained. Other idler rollers at 26 are rotatably mounted in the casing and are so arranged that when the chain 15a is entrained thereover the portions of the chain extending between idler rollers 26 and idler rollers 28 is in straight lines. The chain will in this manner remain taut and in driving engagement with sprockets 27 and 18a in all adjusted positions of reciprocable member 29. It will be evident that sprockets 26 and 28 could be in the form of smooth surfaced guide rollers, or sprockets, since there is no driving engagement of chain 15a with any of rollers 26 or 28.

Reciprocable member 29 has a piston-like element 17d at one end which may be in the form of a piston or a diaphragm and one side of which is exposed to a chamber 17c to which air, under pressure, is supplied via a conduit 17e from a source of air, under pressure, indicated at 17f. The pressure of the supply of air to chamber 17c is adjustable by a regulating valve 17g so that the bias exerted on reciprocable member 29 via element 17d can be controlled.

At this point it will be evident that if member 29 is biased toward the right by a supply of pressure to chamber 17c, sprocket 18a will be urged in a c'ockwise direction which will, in turn, urge shaft 19 and sprocket 13 in a clockwise direction and this will be transmitted by drive element 12 to sprocket 11 so that shaft 10 and guide rollers 8 mounted thereon will be urged in a clockwise direction. This will, as will be evident in FIGURE 1, apply a tensioning force to the bearings 3 via e'ements 7 to maintain a predetermined tension in felt 2. The particular degree of this tensioning can be regulated by adjusting the supply to chamber 17c.

The aforementioned sprocket 27 over which chain 15a is entrained is mounted on a shaft which also carries a worm wheel 30. Worm wheel 30 meshes with a worm 31 connected to the output shaft of a rotary motor 24. Motor 24 is, advantageously, pneumatically operated and has inlet connections 25. The inlet connections are supplied from the service ports of a control valve mechanism at 20 which has a pressure inlet conduit 20a through which air under pressure is supplied to the control valve mechanism.

Control elements 21, 22 and 21a are associated with the control valve mechanism and are so arranged that when the control element 21 is actuated, motor 24 will rotate in a direction to cause worm 31 to drive worm wheel 30 and sprocket 27 in a clockwise direction. When control element 21a is actuated, motor 24 will run in the opposite direction and cause worm 31 to drive worm wheel 30 and sprocket 27 in a counterclockwise direction. When control element 22 is actuated the motor 24 is deenergized.

The control elements are adapted for actuation by an actuator element 23a carried on the end of or moveable by reciprocable element 29. The worm 31 and worm wheel 30 are of a self-locking nature so that when motor 24 is deenergized sprocket 27 is held against rotation.

The arrangement is such that when reciprocable member 29 is biased toward the right by a supply of pressure fluid to chamber 17c, felt 2 will be tensioned by a force exerted on roller 1 toward the right. If, now, felt 2 stretches to the point that the reciprocable member 29 moves to the right far enough to bring actuating element 23a into engagement with control element 21, motor 24 will be energized so as to drive sprocket 27 in a clockwire direction and pull member 29 to the left toward an intermediate position. Motor 24 will continue to run until actuating element 23a engages control element 22, which will interrupt supply of energy to motor 24 and permit it to come to a halt.

It will be appreciated that the tension on the felt, due to the thrust being exerted on reciprocable member 29 by element 17d, will remain substantially constant even though motor 24 is energized and causes movement of member 29.

Should the felt shrink and pull reciprocable member 29 to the left, the same action will occur when actuating element 23 engages control element 21a except the motor 24 will operate in the opposite direction, and sprocket 27 will be driven counterclockwise until the reciprocable member returns to its intermediate position.

For convenience, in order to permit manual operation of the device so as to be able to let the felt 2 go slack for removal or to draw it up snug when a new felt is put on, bevel gears 31a may be provided which connect worm 31 to a shaft 31b having a squared end projecting from the casing for receiving a crank. In this manner, by cutting of the supply of air pressure, the worm 31 can be rotated manually at any time desired to loosen or tighten the felt. The air supply to motor 24 can be cut off by closing valve 20b in line 20a, and the air supply to chamber 17c can be cut off at valve 17g, or by another valve in conduit 17e.

In FIGURE 2 a similar arrangement is illustrated except in FIGURE 2, shaft 19, which carries sprocket 13, has mounted thereon a worm wheel 18. Worm wheel 18 is in mesh with a worm 15 which is reciprocable and rotatable within the casing 14. The worm 15 and worm wheel 18 form a self-locking worm and worm wheel arrangement so that worm 15 can not be rotated by worm wheel 18.

Worm 15 is mounted on a shaft that is supported by a bearing 16 in the piston 17b which has one face exposed to pressure in chamber 17a, and which chamber is supplied with pressure in the same manner as described in connection with chamber 17c of FIGURE 1. The end of the shaft carrying worm 15 opposite bearing 16 is connected to a sleeve 16b which is axially slidable on output shaft 24a of rotary motor 24 while being keyed against rotation relative thereto by key 16c.

Sleeve 16b carries a cam disc portion 23 which is adapted for actuating control elements 21, 22 and 21a of the control valve device 20 which is the same as that shown and described in connection with the FIGURE 1 modification. Motor 24 may include a squared stud shaft 24b extending therefrom by means of which the motor and, therefore, worm 15 can be manually rotated for the same reason as explained in connection with the modification of FIGURE 1.

In the FIGURE 2 modification, the worm 15 will reciprocate without rotation under the influence of pressure in chamber 17a to drive sprocket 13 and thereby place a bias on the tensioning roller 1, while worm 15 will rotate without reciprocation under the influence of motor 24 thereby to adjust the axial position of the worm.

Both of the modifications, it will be appreciated, have a highly specialized sort of differential mechanism in which a relatively short stroke motor represented by the reciprocable elements 17b, 17d, drives a first input member, whereas a larger stroke motor represented by rotary motor 24 drives a second input member. The differential unit comprises an output member drivingly connected to both of the input members and adapted for supplying power to chain 12 by means of which the shaft 10 is biased and from which bias is delivered via guide rollers or sprockets 8 and tensioning elements 7 to the bearings 3 of the roller 1.

It will be evident that the device according to the present invention could be so arranged that the reciprocable member was moveable in the vertical direction and when this is done it is advisable to counterbalance the weight of the reciprocating parts, as by a tandem piston arrangement in which a second piston and cylinder connected to the reciprocating member exactly balances the weight thereof.

By the use of the present invention, felts in any location can have in a papermaking machine the tension thereof accurately controlled whether the felts are large or small and whether or not the felts so change from time to time that substantial automatic adjustment of the tensioning mechanism is required. The felt tension is subject to extremely accurate and stepless control according to the present invention and, furthermore, the felt tension can be changed during machine operation and without any danger whatsoever to the operators.

When a felt is to be changed it becomes a simple matter to reduce the tension on the felt and to permit the felt to go slack so that it can be removed and a new felt put on.

Inasmuch as the tension in the felt is a function of the pressure supplied to the piston of the short stroke reciprocating device forming a part of the tensioning mechanism, it will be apparent that the controls for adjusting the tensions in the various felts can be located remote from the felts themselves, such as in a control panel and all of the tensioning devices operated from one centrally located position. This would represent an obvious convenience and it will be apparent that the device of the present invention is particularly well adapted to this type of installation.

It will also be evident that other belt-like members, such as power transmission belts and conveyor belts, can have the tension therein controlled in the same manner as described above.

What is claimed is:

1. A device for controlling the tension in an endless belt-like member such as a papermaker's felt in which the belt-like member is entrained over a main roller which is mounted in bearings at the ends thereof and carriage means supporting said bearings for movement thereof together with said main roller in a direction perpendicular to the axis of the main roller to adjust the tension in said belt-like member, power transmitting means operatively connected to the bearings for exerting a force thereon to adjust the tension in said belt-like member, a first rotatable drive member operatively connected to said power transmitting means, a second rotatable drive member spaced from said first drive member, means drivingly connecting said first and second drive members so that a force exerted on said second drive member will act through said first drive member on said power transmitting means, a limited stroke first drive means, a reversible and greater stroke second drive means, a differential drive having a first input member connected to said first drive means and a second input member connected to said second drive means and an output member connected to said second drive member, means for energizing said first drive means to bias said first input member in a direction to cause said output member to urge said second drive member in a direction to exert a force on said bearings via said power transmitting means tending to increase the tension in said belt-like member, control means operable in response to movement of said first input member a predetermined distance away from a certain intermediate position thereof for energizing said second drive means to move said second input member in a direction to cause said first input member to return to said intermediate position thereof, and means for preventing movement of said second input member in the direction in which it is actuated by said second drive means when said second drive means is deenergized.

2. A device according to claim 1 in which said first drive means is a reciprocable motor and said second drive means is a rotary motor.

3. A device according to claim 2 in which said reciprocable motor is a fluid motor.

4. A device according to claim 3 which includes means for varying the pressure supplied to said fluid motor to adjust the tension in said belt-like member.

5. A device according to claim 3 in which said rotary motor is fluid operated.

6. A device according to claim 2 in which said first input member is a reciprocable member and said second input member is rotatable, a first sprocket connected to said second drive member and a stationarily mounted rotatable second sprocket, a drive chain entrained over said first and second sprockets, a first idler roller on said reciprocable member over which each reach of said drive chain passes, second stationary idler rollers between each first idler roller and each of said first and second sprockets and engaging the outside of said drive chain so the drive chain extending from each first idler roller to each second idler roller is parallel to the direction of movement of said reciprocable member, and means connecting said second input member with said second sprocket operable to cause rotation of said second sprocket when said rotary motor is energized while preventing rotation of said second sprocket when said rotary motor is deenergized.

7. A device according to claim 6 in which said means connecting said second input member with said second sprocket is a worm wheel fixed to the second sprocket to rotate therewith and a worm connected to said second input member to be rotated thereby, said worm and worm wheel being of the self-locking type.

8. A device according to claim 2 in which said differential drive includes a self-locking worm and worm wheel, said worm wheel being fixed to said second drive member to rotate therewith, said worm meshing with said worm wheel, said first input member rotatably but nonaxially moveably connecting said worm to said reciprocable motor and said second input member connecting said worm to said rotary motor for rotation thereby while permitting reciprocation of said worm by said reciprocable motor.

9. A device according to claim 8 in which said rotary motor is stationarily mounted and said second input member includes means for permitting axial movement of said worm relative to said rotary motor.

10. A device according to claim 1 which includes means for manually actuating said second input member to effect manual adjustment of the tension in said belt-like member.

11. A device according to claim 1 in which said control means includes first and second spaced control elements and each operable when actuated to energize said rotary motor for rotation in a respective direction, a third control element intermediate said first and second control elements operable when actuated to deenergize said rotary motor, and an actuating element driven by said reciprocating motor and operable to engage and actuate said control elements in response to reciprocation of said reciprocating motor.

12. A device according to claim 1 in which said power transmitting means comprises a pair of guide rollers stationarily but rotatably mounted on opposite sides of each bearing and spaced therefrom in the direction of movement of said bearings, a flexible drive element entrained over each pair of guide rollers so as to form a loop with two reaches, each bearing being connected to a corresponding reach of the pertaining element, a shaft to which the said guide roller on one side of the said bearings is fixed, and said first drive member drivingly connected to said shaft whereby rotation of said shaft by said first drive member will cause rotation of the guide rollers by the shaft and movement of said drive elements and thereby impart movement to said bearings and main roller.

13. A device according to claim 1 which includes a casing containing said first and second drive means and said differential drive and said control means and said second drive member, said casing being adapted for connection to the frame of a machine supporting said shaft and said first drive member.

References Cited
UNITED STATES PATENTS

| | | | |
|---|---|---|---|
| 934,857 | 9/1909 | Trempe | 74—242.14 |
| 1,523,988 | 1/1925 | Vance. | |
| 1,663,344 | 3/1928 | Lennard. | |

FRED C. MATTERN, JR., Primary Examiner

JAMES A. WONG, Assistant Examiner